(12) United States Patent
Chatterjee et al.

(10) Patent No.: US 11,467,571 B2
(45) Date of Patent: Oct. 11, 2022

(54) SYSTEMS AND METHODS FOR BUILDING MANAGEMENT SYSTEM SENSOR DIAGNOSTICS AND MANAGEMENT

(71) Applicant: JOHNSON CONTROLS TYCO IP HOLDINGS LLP, Milwaukee, WI (US)

(72) Inventors: Abhigyan Chatterjee, Asanol (IN); Rohit Bhagwan Mansukhani, Mumbai (IN); Rajesh C. Nayak, Vidyaratna Nagar Manipal (IN); Moheet Vishwas, Dubai (AE)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 509 days.

(21) Appl. No.: 16/294,268

(22) Filed: Mar. 6, 2019

(65) Prior Publication Data
US 2020/0285226 A1 Sep. 10, 2020

(51) Int. Cl.
*G05B 23/02* (2006.01)
(52) U.S. Cl.
CPC ..... *G05B 23/0275* (2013.01); *G05B 23/0227* (2013.01); *G05B 2219/24053* (2013.01); *G05B 2219/2614* (2013.01)
(58) Field of Classification Search
None
See application file for complete search history.

(56) References Cited

U.S. PATENT DOCUMENTS

| 4,660,386 A * | 4/1987 | Hansen | F25B 49/005 62/126 |
|---|---|---|---|
| 2009/0107159 A1* | 4/2009 | Mann, III | B64F 1/364 62/239 |
| 2012/0221165 A1* | 8/2012 | Ooba | H02J 13/00002 700/297 |
| 2013/0086010 A1* | 4/2013 | Wenzel | G06F 11/0727 707/692 |
| 2013/0090769 A1* | 4/2013 | McKie | F24F 11/30 700/277 |
| 2014/0032506 A1* | 1/2014 | Hoey | G06F 16/215 707/691 |
| 2017/0212482 A1* | 7/2017 | Boettcher | F24F 11/62 |
| 2019/0025776 A1 | 1/2019 | Bhattacharya et al. | |

* cited by examiner

*Primary Examiner* — Bernard G Lindsay
(74) *Attorney, Agent, or Firm* — Foley & Lardner LLP

(57) ABSTRACT

A sensor management system includes a historical data repository, a building management system (BMS) controller, and a sensor diagnostics system. The historical data repository may store historical data by a plurality of sensors. The BMS controller may control one or more components of a building subsystem based on data provided by one or more sensors. The sensor diagnostic system may receive, from a sensor, sensor data. The sensor diagnostic system may determine at least one fault in the sensor data. The sensor diagnostic system may select, from the historical data repository, substitute sensor data for the sensor based on a comparison of one or more attributes of the sensor data and one or more attributes of the historical data in the data repository. The sensor diagnostic system may provide, in replacement of the sensor data from the sensor, the supplemental sensor data to the BMS controller.

20 Claims, 8 Drawing Sheets

SYSTEMS AND METHODS FOR BUILDING MANAGEMENT SYSTEM SENSOR DIAGNOSTICS AND MANAGEMENT

BACKGROUND

The present disclosure relates generally to a building management system and more particularly to fault detection systems in buildings. The present disclosure relates specifically to a fault detection system which intelligently supplements sensor data.

A building typically includes various building subsystems. Examples of such building subsystems include, for instance, an HVAC subsystem, a security subsystem, a lighting subsystem, and so forth. Each of the building subsystems may include a number of device(s) for controlling various aspects of the respective building subsystem.

Occasionally, sensors in various building subsystems may experience faults. As a result of sensor faults, the corresponding sensors may provide inconsistent data. Both the inconsistent data and the time to replace such sensors may result in downtime.

SUMMARY

One implementation of the present disclosure is a sensor management system. The sensor management system includes a historical data repository configured to store historical data from a plurality of sensors. The historical data comprising one or more attributes defining one or more characteristics related to the capture of the historical data. The sensor management system includes a building management system (BMS) controller configured to control one or more components of a building subsystem based on data provided by one or more sensors. The sensor management system includes a sensor diagnostic system communicably coupled to a sensor of a building subsystem, the historical data repository, and the BMS controller. The sensor diagnostic system includes a processing circuit including a processor and memory. The memory stores instructions that, when executed by the processor, cause the processor to perform operations. The operations include receiving, from a sensor of the one or more sensors, sensor data. The operations include determining, based on the sensor data, at least one fault in the sensor data. The operations include selecting, from the data repository, substitute sensor data for the sensor. The substitute sensor data is selecting based on a comparison of one or more attributes of the sensor data and the one or more attributes of the historical data in the data repository. The operations include providing, in replacement of the sensor data from the sensor, the substitute sensor data to the BMS controller.

In some embodiments, the operations further include deactivating the sensor responsive to determining that the sensor data includes at least one fault.

In some embodiments, providing the supplemental sensor data includes identifying a sample rate for the sensor, and providing, in replacement of the sensor data from the sensor, the substitute sensor data to the BMS controller at the identified sample rate.

In some embodiments, the operations further include receiving, from an operator client device, a disable signal. The operations may further include disabling the providing of the supplemental data to the BMS controller.

In some embodiments, the at least one attribute of the historical sensor data is at least a portion of a timestamp indicating a day and month in which the historical sensor data is captured.

In some embodiments, the historical sensor data was captured at least a year prior to the sensor data being captured by the sensor.

In some embodiments, the at least one attribute of the historical sensor data is metadata which indicates a service space, and wherein the sensor services the service space Another implementation of the present disclosure includes a sensor diagnostic system communicably coupled to a sensor of a building subsystem, a historical data repository and a building management system (BMS) controller. The historical data repository is configured to store historical data from a plurality of sensors. The historical data comprising one or more attributes defining one or more characteristics related to the capture of the historical data. The BMS controller configured to control one or more components of a building subsystem based on data provided by one or more sensors. The sensor diagnostic system includes a processing circuit including a processor and memory. The memory stores instructions that, when executed by the processor, cause the processor to perform operations. The operations include receiving, from a sensor of the one or more sensors, sensor data. The operations include determining, based on the sensor data, at least one fault in the sensor data. The operations include selecting, from the data repository, substitute sensor data for the sensor. The substitute sensor data is selecting based on a comparison of one or more attributes of the sensor data and the one or more attributes of the historical data in the data repository. The operations include providing, in replacement of the sensor data from the sensor, the substitute sensor data to the BMS controller.

In some embodiments, providing the supplemental sensor data includes identifying a sample rate for the sensor, and providing, in replacement of the sensor data from the sensor, the supplemental sensor data to the BMS controller at the identified sample rate.

In some embodiments, the operations further include receiving, from an operator client device, a disable signal. The operations may further include disabling the providing of the supplemental data to the BMS controller.

In some embodiments, the disable signal is received responsive to the sensor being replaced with a replacement sensor. The operations may further include providing, to the BMS controller, sensor data from the replacement sensor.

In some embodiments, the at least one attribute of the historical sensor data is at least a portion of a timestamp indicating a day and month in which the historical sensor data is captured.

In some embodiments, the historical sensor data was captured at least a year prior to the sensor data being captured by the sensor.

In some embodiments, the at least one attribute of the historical sensor data is metadata which indicates a service space, and wherein the sensor servicing the service space.

Another implementation of the present disclosure includes a method of managing sensor data. The method includes receiving, from a sensor of a building subsystem servicing a space in a building, sensor data. The method includes determining, based on the sensor data, a presence of faulty sensor data. The method includes selecting, from a historical data repository configured to store historical data from a plurality of sensors which includes one or more attributes defining, substitute sensor data for the sensor. The substitute sensor data is selecting based on a comparison of one or more attributes of the faulty sensor data and the one or more attributes of the historical data in the data repository. The method includes providing, in replacement of the sensor data from the sensor, the substitute sensor data to a BMS controller configured to control one or more components of the building subsystem.

In some embodiments, the method further includes deactivating the sensor responsive to determining that the sensor data is faulty.

In some embodiments, providing the supplemental sensor data includes identifying a sample rate for the sensor, and providing, in replacement of the sensor data from the sensor, the supplemental sensor data to the BMS controller at the identified sample rate.

In some embodiments, the method further includes receiving, from an operator client device, a disable signal. The method may further include disabling the providing of the supplemental data to the BMS controller.

In some embodiments, the at least one attribute of the historical sensor data is at least a portion of a timestamp indicating a day and month in which the historical sensor data is captured.

In some embodiments, the at least one attribute of the historical sensor data is metadata which indicates a service space, and wherein the sensor services the service space.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
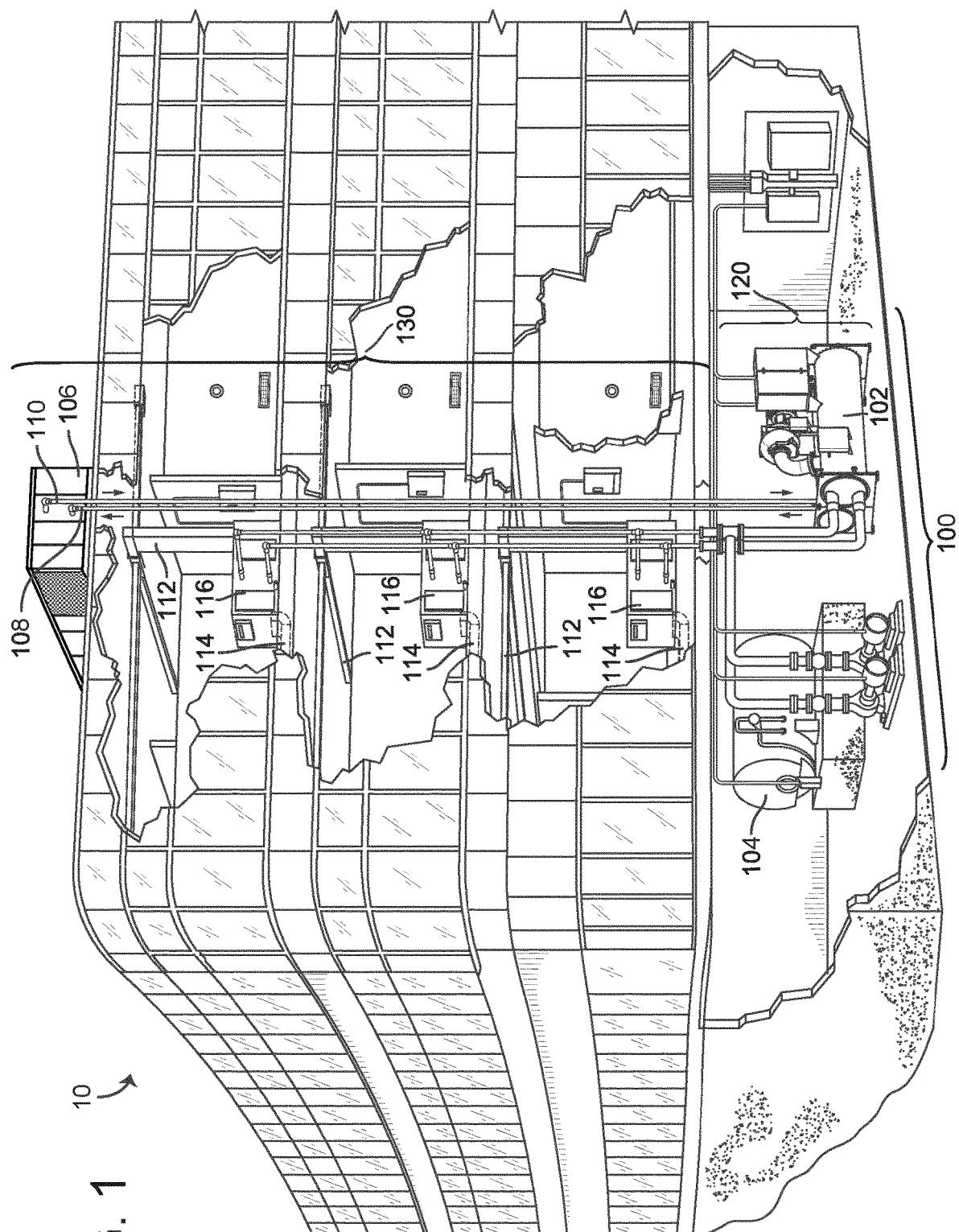
FIG. 1 is a drawing of a building equipped with a heating, ventilating, or air conditioning (HVAC) system and a building management system (BMS), according to an exemplary embodiment.

Referring generally to the FIGURES, systems and methods for sensor diagnostics and management are shown and described, according to an exemplary embodiment. The systems and methods described herein may automatically replace sensor data from sensors experiencing a fault with historical sensor data. The systems and methods described herein may be practiced in any number of environments, buildings, enterprises, etc.

In some implementations of building management solutions, various sensor(s) may be arranged in a building to monitor, evaluate, or otherwise detect conditions in a respective building subsystem. The sensor(s) may generate sensor data corresponding to such detected conditions. In most instances, the sensor data is reliable. However, in some instances (such as those where the sensor(s) are experiencing a fault), the sensor data may be unreliable. Where the sensor(s) are experiencing a fault, the sensor(s) may be replaced or fixed so as to alleviate the unreliable sensor data. As a result, the building and/or building subsystem may have downtime while the sensor(s) are replaced or fixed. Such downtime may interrupt business, decrease profits and productivity, etc. In some embodiments, systems and methods described herein advantageously automatically detect sensor faults and supplement the corresponding sensor data to decrease downtime.

According to at least some aspects described herein, a sensor management system includes a historical data repository, a building management system (BMS) controller, and a sensor diagnostics system. The historical data repository may be configured to store historical data from a plurality of sensors. The historical data may be recorded under a plurality of conditions. The BMS controller may be configured to control one or more components of a building subsystem based on data provided by one or more sensors. The sensor diagnostic system may be communicably coupled to a sensor of a building subsystem, the historical data repository, and the BMS controller. The sensor diagnostic system may receive, from a sensor of the one or more sensors, sensor data corresponding to a detected condition of the building subsystem. The sensor diagnostic system may determine, based on the sensor data, that the sensor is experiencing a fault. The sensor diagnostic system may identify, in the data repository, supplemental sensor data for the sensor. The supplemental sensor data may be identified based on a condition in which the sensor data is received from the sensor. The sensor diagnostic system may provide, in replacement of the sensor data from the sensor, the supplemental sensor data to the BMS controller.

Some embodiments described herein provide a system and method for sensor diagnostics and management. Some embodiments described herein decrease downtime by automatically detecting faults of sensors and replacing sensor data corresponding to sensors experiencing faults with historical sensor data. Since the sensor data is replaced with historical sensor data, the sensors are—in effect—taken out of commission (as the sensor data generated thereby is not provided to any systems/components) while the building subsystem itself remains operational. Some embodiments described herein maintain performance/operation characteristics by selecting historical sensor data from the historical data repository which is most similar to expected sensor data from the sensor(s). Some embodiments select the most similar historical sensor data by identifying sensor data captured under similar conditions as the conditions in which the sensor(s) experiencing a fault captured the corresponding sensor data. Various other benefits and aspects of the disclosure are described hereinafter with reference to the FIGURES below.

Building Management System and HVAC System

Referring now to FIGS. 1-4, an exemplary building management system (BMS) and HVAC system in which the systems and methods of the present disclosure may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS may include, for example, an HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that may be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve set point conditions for the building zone.

Figure 2:
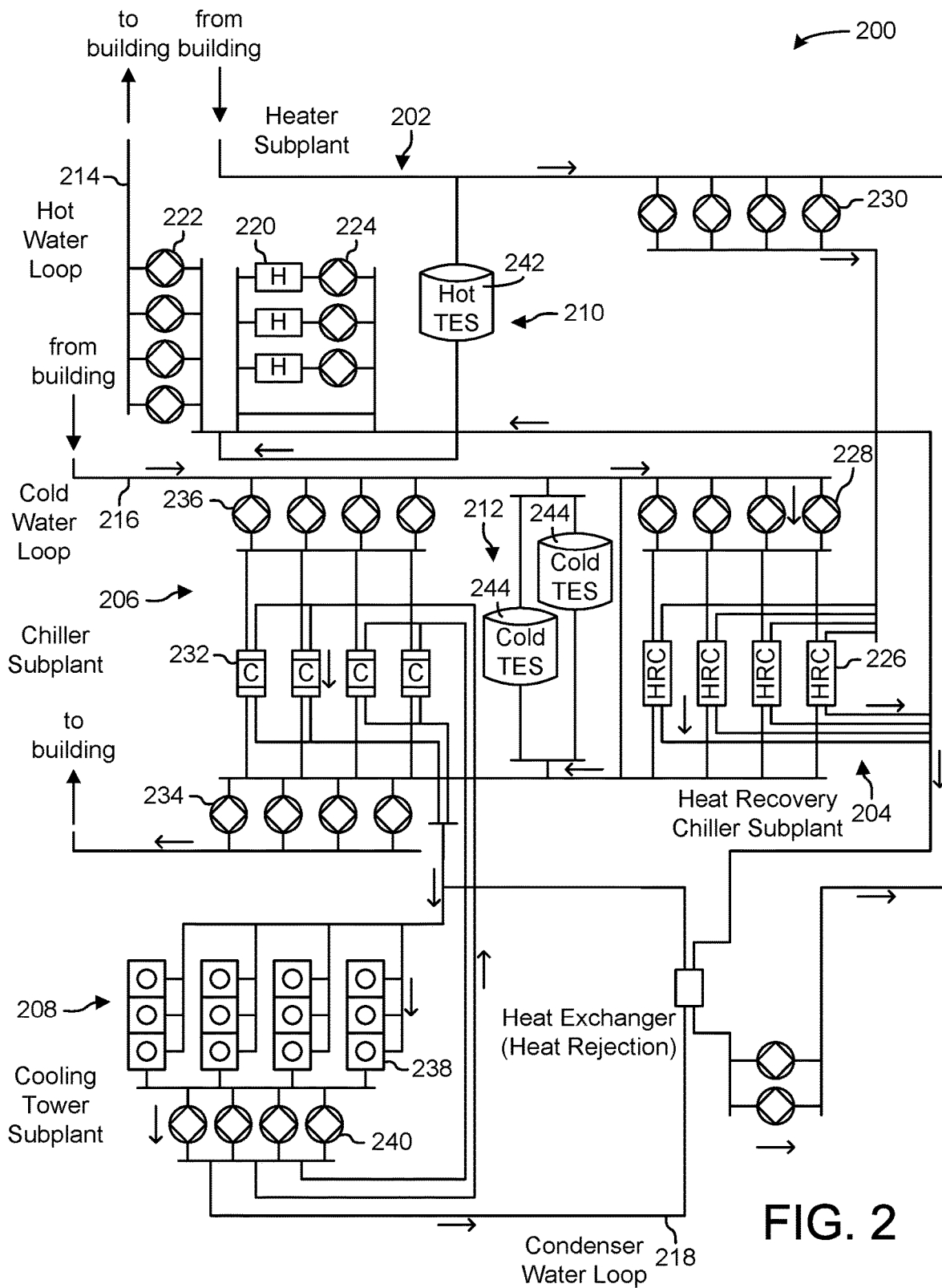
FIG. 2 is a schematic diagram of a waterside system which may be used to support the HVAC system of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
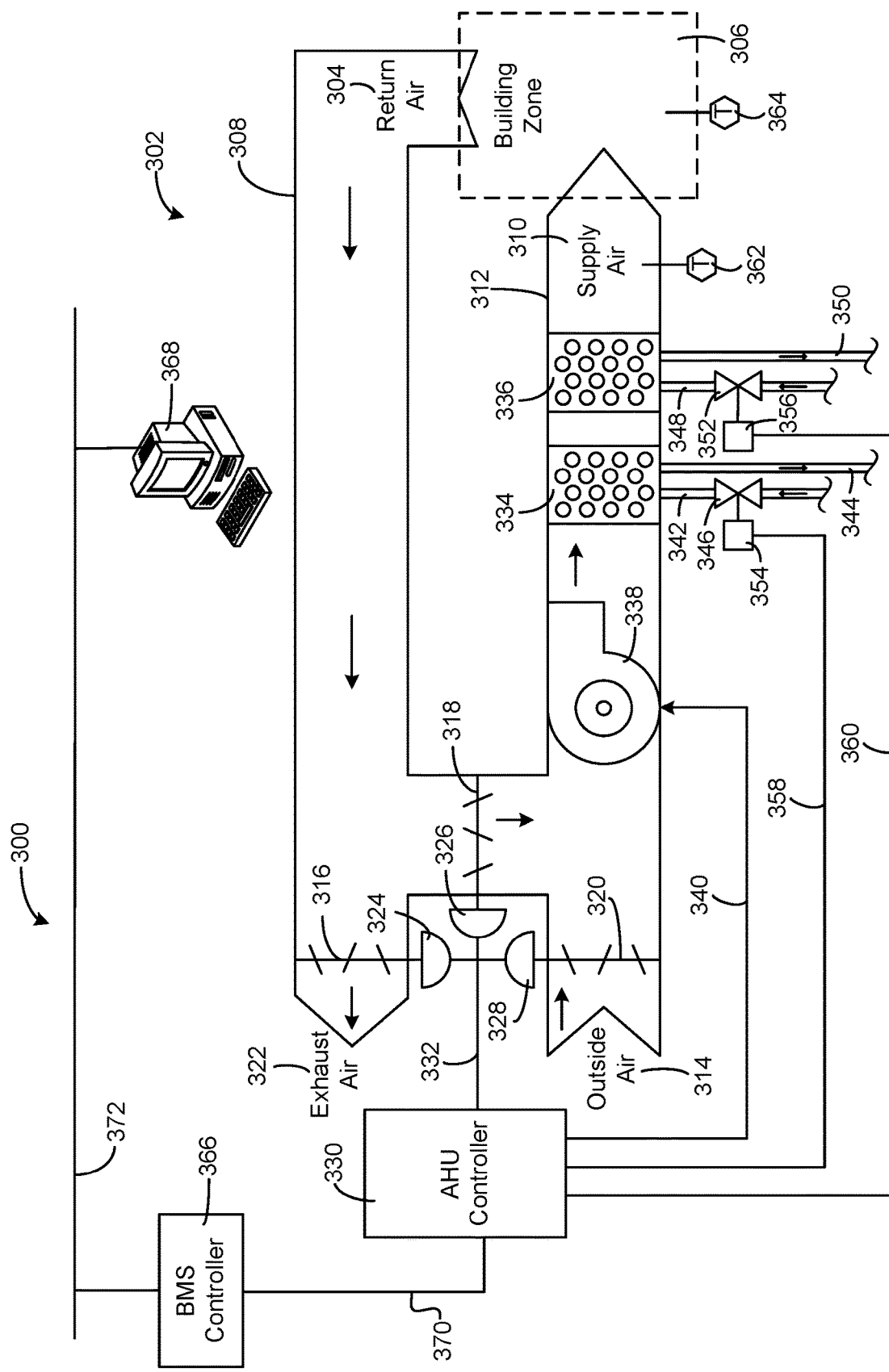
FIG. 3 is a block diagram of an airside system which may be used as part of the HVAC system of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type AHU 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that may be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that may be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a BMS controller 366 and a client device 368. BMS controller 366 may include one or more computer systems (e.g., servers, supervisory controllers, subsystem controllers, etc.) that serve as system-level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that may be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
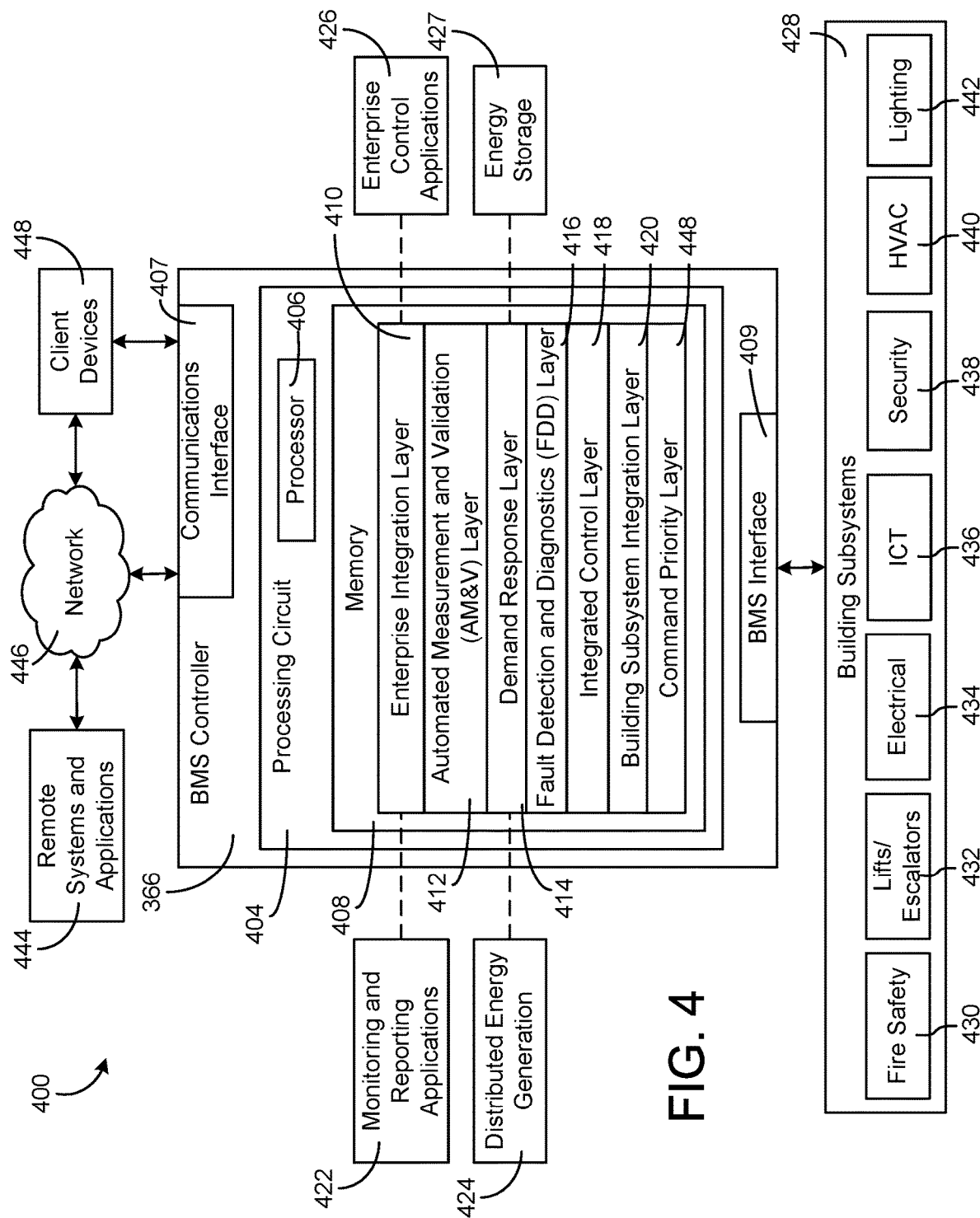
FIG. 4 is a block diagram of a BMS which may be implemented in the building of FIG. 1, according to an exemplary embodiment.

Referring now to FIG. 4, a block diagram of a BMS 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, an HVAC subsystem 440, a lighting subsystem 442, a lift/escalators subsystem 432, and a fire safety subsystem 430. In various embodiments, building subsystems 428 may include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include any number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407 and 409 may be or may include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407 and 409 may be direct (e.g., local wired or wireless communications) or via a communications network 446 (e.g., a WAN, the Internet, a cellular network, etc.). For example, interfaces 407 and 409 may include an Ethernet card and port for sending and receiving data via an Ethernet-based communications link or network. In another example, interfaces 407 and 409 may include a Wi-Fi transceiver for communicating via a wireless communications network. In another example, one or both of interfaces 407 and 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof may send and receive data via interfaces 407 and 409. Processor 406 may be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers, and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments, BMS controller 366 may be distributed across multiple servers or computers (e.g., that may exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 may work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translates communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses may include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions may specify which equipment may be turned on or off in response to particular demand inputs, how long a system or piece of equipment should be turned off, what setpoints may be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 may integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions may be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and AM&V layer 412. Integrated control layer 418 may be configured to provide calculated inputs (e.g., aggregations) to these higher levels based on outputs from more than one building subsystem.

AM&V layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

FDD layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes may be examined by FDD layer 416 to expose when the system begins to degrade in performance and alert a user to repair the fault before it becomes more severe.

Systems and Methods for Sensor Diagnostics and Management

Figure 5:
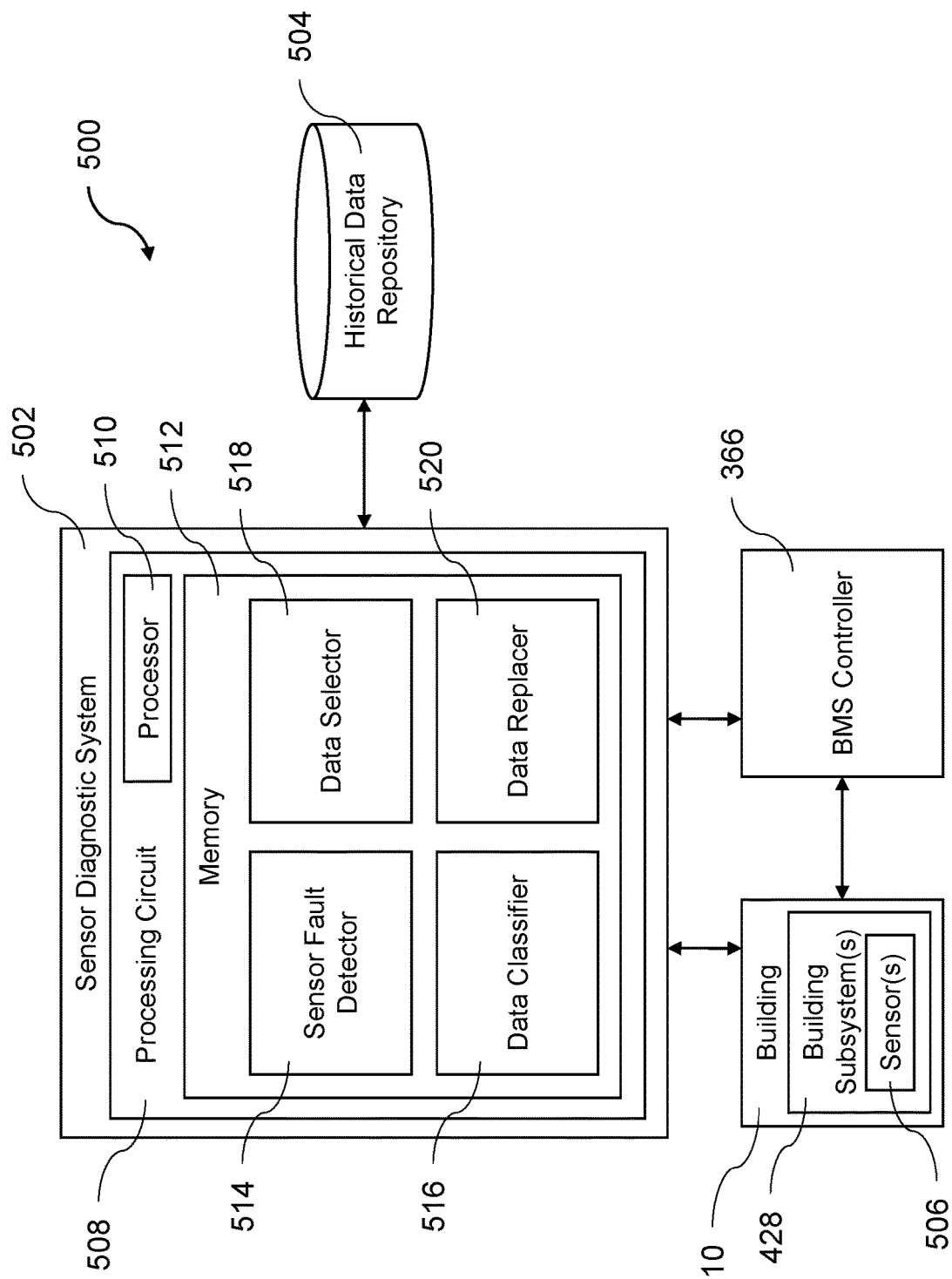
FIG. 5 is a block diagram of a system for sensor management, according to an exemplary embodiment.

Referring to FIG. 5, depicted is a block diagram of a system 500 for sensor management, according to an exemplary embodiment. The system 500 is shown to include a sensor diagnostics system 502, a historical data repository 504, a building 10 (similar to the buildings 10 described above with reference to FIG. 1), and the BMS controller 366 (similar to the BMS controller 366 described above with reference to FIG. 3 and FIG. 4). The building 10 may include a plurality of sensors 506. The sensor(s) 506 may be components or elements of a respective building subsystem 428. As described in greater detail below, the sensor diagnostics system 502 may be configured to receive the sensor data from the sensor(s) 506. The sensor diagnostics system 502 may be configured to determine whether the sensor(s)

506 are experiencing a fault based on the sensor data. The sensor diagnostics system 502 may be configured to selectively provide supplemental sensor data from the historical data repository 504 to the BMS controller 366 based on whether the sensor(s) 506 are experiencing a fault.

As described in detail above, the BMS controller 366 may generally be configured to control various aspects, devices, components, etc. within the various building subsystems 428 (for instance, a fire safety subsystem 430, lifts/escalators subsystem 432, electrical subsystem 434, ICT subsystem 436, security subsystem 438, HVAC subsystem 440, lighting subsystem 442, as described with reference to FIG. 4). Generally speaking, the building subsystem integration layer 420 may be configured to manage communications between BMS controller 366 and building subsystems 428. The building subsystem integration layer 420 may be configured to receive sensor data and input signals from the building subsystems 428 and provide output data and control signals to the building subsystems 428. The building subsystem integration layer 420 may translate communications (such as sensor data) across a plurality of multi-vendor/multi-protocol systems. The demand response layer 414 may be configured to receive inputs from various other layers (such as the building subsystem integration layer 420) and implement various strategies to satisfy the demand of the building 10. Hence, generally speaking, the building subsystem integration layer 420 of the BMS controller 366 may receive inputs (including sensor data), the demand response layer 414 may generate control signals for various building components based on the inputs received by the building subsystem integration layer 420, and the building subsystem integration layer 420 may provide the control signals generated by the demand response layer 414 to building subsystems 428.

The system 500 is shown to include a sensor diagnostic system 502. The sensor diagnostic system 502 may be any device(s) or component(s) designed or implemented to identify faults of sensor(s) 506 in the various building subsystem(s) 428. The sensor diagnostic system 502 may be configured to replace sensor data from the sensor(s) 506 experiencing a fault with historical sensor data stored in the historical data repository 504. The sensor diagnostic system 502 may be configured to provide the historical sensor data to the BMS controller 366 for controlling the building subsystem(s) 428. Hence, in some instances, the BMS controller 366 may control the building subsystem(s) 428 based on sensor data generated by the sensor(s) 506, and, in other instances, the BMS controller 366 may control the building subsystem(s) 428 based at least in part on historical sensor data. While shown as separate from the BMS controller 366, in some embodiments, the sensor diagnostic system 502 may be a component of, an aspect of, or otherwise incorporated or integrated into the BMS controller 366. Similarly, in some embodiments, the BMS controller 366 may be a component of, an aspect of, or otherwise incorporated or integrated into the sensor diagnostic system 502.

The sensor diagnostic system 502 is shown to be communicably coupled to the building 10 (e.g., the sensor(s) 506 of the building subsystem(s) 428) and the BMS controller 366. The sensor diagnostic system 502 may be communicably coupled to the building 10 and BMS controller 366 via any communications protocols, devices, networks, etc. which facilitate communication between two or more components. In some embodiments, any communication between the BMS controller 366 and building subsystem(s) 428 may be routed through the sensor diagnostic system 502. In other embodiments, a subset of communication, such as communications including sensor data, may be routed through the sensor diagnostic system 502, and other communications may be exchanged directly between the building subsystem(s) 428 and BMS controller 366. In each embodiment, the sensor diagnostic system 502 may be configured to receive at least some data from the building subsystem(s) 428 prior to processing/analyzing/etc. by the BMS controller 366.

The sensor diagnostic system 502 is shown to include a processing circuit 508 including a processor 510 and memory 512. In some embodiments, the processing circuit 508 may be similar to the processing circuit 404 described above with reference to FIG. 4. For instance, the processor 510 may include aspects similar to processor 406, memory 512 may include aspects similar to memory 408, and so forth.

The memory 512 is shown to include a sensor fault detector 514. The sensor fault detector 514 may be any device(s), component(s), application(s), agent(s), etc. designed or implemented to detect or identify faults of the sensor(s) 506. In some embodiments, the sensor fault detector 514 may be configured to determine that various sensor(s) 506 are experiencing faults based on the sensor data received from the sensor(s) 506. The sensor fault detector 514 may determine that various sensor(s) 506 are experiencing faults based on a comparison of sensor data received from the sensor(s) 506 to other sensor(s) 506 servicing the same area or space, based on a comparison of sensor data received from the sensor(s) 506 in comparison to known, stored, etc. sensor data corresponding to fault conditions, and so forth. In some embodiments, the sensor fault detector 514 may be incorporated into the FDD layer 414 of the BMS controller 366. In some embodiments, the sensor fault detector 514 may identify faulty sensor data using one or more rules/sub-rules. The sensor fault detector 514 may include aspects similar to those described with reference to U.S. Publication No.: 2019/0025776-A1, filed Feb. 8, 2018 and titled "BUILDING MANAGEMENT SYSTEM WITH DYNAMIC RULES WITH SUB-RULE REUSE AND EQUATION DRIVEN SMART DIAGNOSTICS," the contents of which are herein incorporated by reference in its entirety. While these particular embodiments and arrangements are described and incorporated by reference, the sensor fault detector 514 may be configured to use any number of techniques for identifying faulty sensor data. Hence, the present disclosure is not limited to any particular arrangement of determining that the sensor data is faulty.

The memory 512 is shown to include a data classifier 516. The data classifier 516 may be any device(s), component(s), application(s), agent(s), etc. designed or implemented to classify sensor data from the sensor(s) 506. The data classifier 516 may be configured to classify the sensor data based on metadata for the sensor data. The metadata may be indicative of an attribute of the sensor data. For instance, the metadata may be indicative of an attribute of the sensor(s) 506 which generated the sensor data (such as a location of the sensor(s) 506, a space in which the sensor(s) 506 service, etc., a time at which the sensor data is captured or provided to the sensor diagnostic system 502, weather conditions, such as temperature, humidity, air pressure, etc. in which the sensor data is captured, the equipment set point, and so forth). The data classifier 516 may be configured to classify the sensor data received from the sensor(s) 506 according to the attribute(s) of the sensor data. In some embodiments, the data classifier 516 classifies all sensor data received from each of the sensor(s) 506. In some embodiments, the data classifier 516 classifies sensor data which is determined to be "good" data (e.g., not faulty). The data classifier 516 may classify the good sensor data. The data classifier 516 may be configured to store the good data in the historical data repository 504 for subsequent use, as described in greater detail below.

As described briefly above, the system 500 is shown to include a historical data repository 504. The historical data repository 504 may be or include any storage device, memory, server, database, etc. configured to store historical sensor data. The historical data repository 504 may be configured to receive the classified sensor data from the data classifier 516. In some embodiments, the data classifier 516 may be configured to classify the sensor data, and structure the classified sensor data for storage in the historical data repository 504. Each entry in the historical data repository 504 may be sorted, filtered, etc. according to the attributes which form the basis for classification. As one non-limiting example, the entries may be structured according to the structure depicted in Table 1 provided below.

TABLE 1

Data Structure for Historical Data Repository Entry

| Timestamp | Sensor Data (f) | Unit OCC Mode | OAT | OAH | OCC | Set Point | Sensor |
|---|---|---|---|---|---|---|---|

In the embodiment depicted in Table 1, the data classifier 516 may be configured to extract a timestamp for each sample of the sensor data from a respective sensor 506. The timestamp may indicate both date (e.g., MM/DD/YYYY) and time (e.g., HH:MM:SS) at which the sensor data is recorded or sampled by the sensor 506, received by the data classifier 516, etc. The timestamp may be included in the entry (e.g., as Timestamp). In embodiments where the data classifier 516 classifies all sensor data (including faulty sensor data), the entry may indicate whether the sensor data is faulty (e.g., at Sensor Data (f)). In some embodiments, the data classifier 516 may be configured to extract operational data (e.g., either from the metadata for the sensor data, directly from the component(s)/unit(s)/equipment, or from other data sources). The data classifier 516 may be configured to include the operational data for the unit in each entry (e.g., Unit OCC Mode). The data classifier 516 may be configured to extract weather data (e.g., from the metadata, from other sensor(s) 506, etc.). The weather data may include temperature, humidity, etc. The data classifier 516 may also be configured to extract occupancy data (if available) corresponding to the space in which the sensor 506 services. The data classifier 516 may be configured to include the weather and occupancy data in each entry (e.g., as OAT, OAH, OCC). The data classifier 516 may be configured to extract a set point value (e.g., from the metadata, from other components of the system 500, etc.). The set point value may be a temperature set point, for instance, an airflow set point, etc. The data classifier 516 may be configured to include the set point value in each entry (e.g., as Set Point). Lastly, the data classifier 516 may be configured to include the sensor reading (e.g., sensor data) in the entry (e.g., as Sensor).

Each of these cells of Table 1 may correspond to various attributes of the sensor data. The data classifier 516 may classify received sensor data according to these various attributes, and structure an entry according to the classification. The data classifier 516 may provide the structured entry to the historical data repository 504. The historical data repository 504 may thus store a plurality of entries including sensor data from various sensors 506 and attributes corresponding to the sensor data.

The data classifier 516 may be configured to classify faulty sensor data received from the sensor(s) 506. The data classifier 516 may be configured to classify the faulty sensor data to determine attributes corresponding thereto. The data classifier 516 may determine the attributes corresponding to the faulty sensor data to identify sensor data in the historical data repository 504 having similar attributes, as described in greater detail below. The data classifier 516 may be configured to classify the faulty sensor data to determine the timestamp for the faulty sensor data, the unit operational mode, the weather conditions, occupancy information, and/or the set point. As described in greater detail below, the faulty sensor data may be replaced with substitute sensor data from the historical data repository 504. The data classifier 516 may classify the faulty sensor data to determine attributes corresponding thereto so that the substitute sensor data which is replacing the faulty sensor data has similar attribute(s) to the faulty sensor data.

The memory 512 is shown to include a data selector 518. The data selector 518 may be any device(s), component(s), application(s), agent(s), etc. designed or implemented to look-up, locate, identify, extract, or otherwise select substitute sensor data in the historical data repository 504. The data selector 518 may be configured to filter the entries in the historical data repository 504 according to the classification of the faulty sensor data by the data classifier 516.

Figure 6:
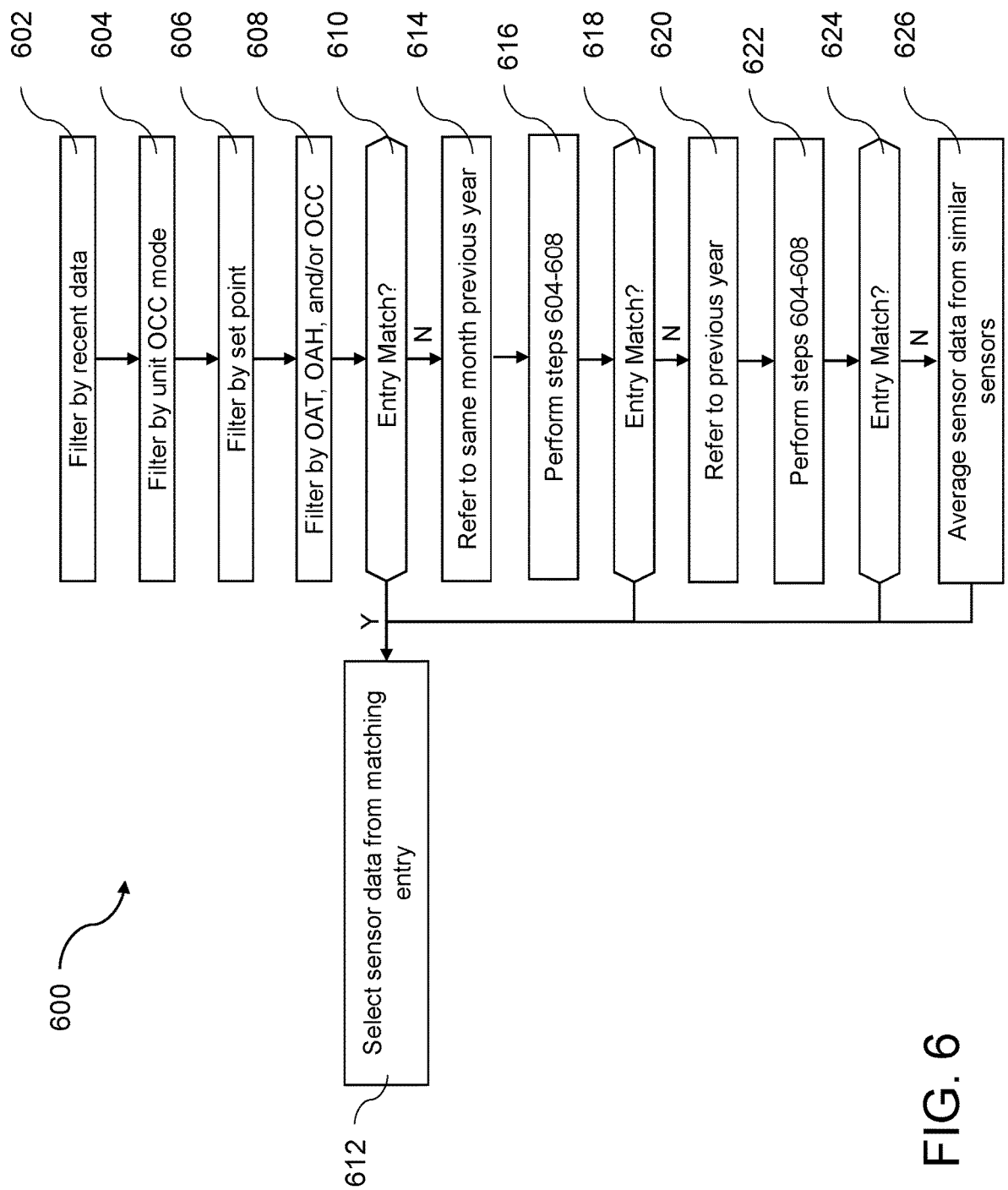
FIG. 6 is a flowchart depicting an example method of selecting substitute data, according to an exemplary embodiment.
Figure 7:
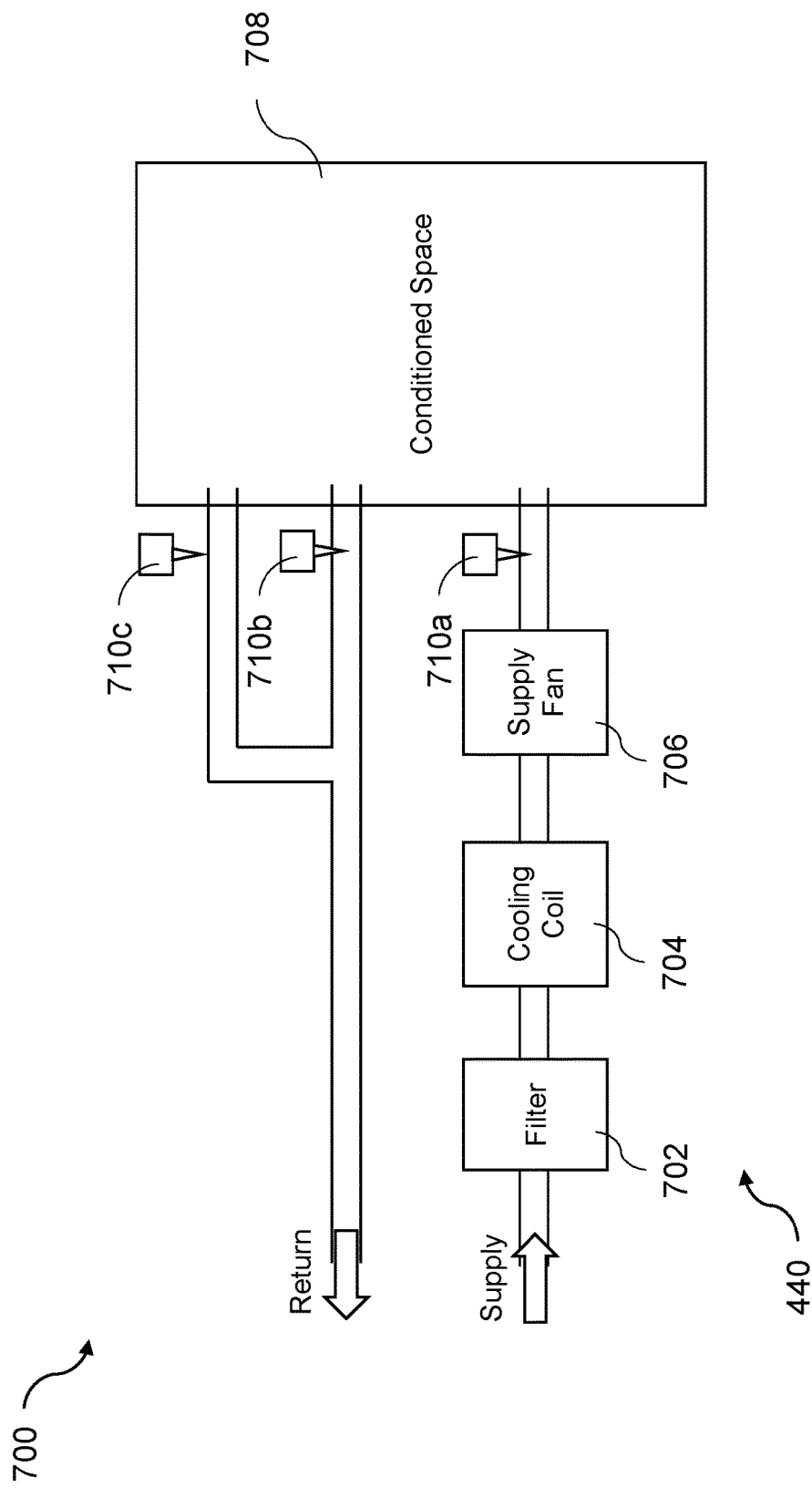
FIG. 7 is an example environment within which the system of FIG. 5 may be implemented, according to an exemplary embodiment.

Referring now to FIG. 6 and FIG. 7, depicted is a flowchart showing an example method 600 of selecting substitute data and an example environment 700 in which the system 500 may be implemented, respectively, according to exemplary embodiments. The method 600 is described with reference to the environment 700 for purposes of illustration. However, it is noted that the present disclosure (including the method 600) is not limited to the particular environment 700.

The environment 700 shown in FIG. 7 includes various components of the HVAC subsystem 440 including a filter 702, a cooling coil 704 and a supply fan 706. Air may be drawn (e.g., along a supply vent) through the filter 702 and across the cooling coil 704 by the supply fan 706. The supply fan 705 may push air into the conditioned space 708. Various temperature sensors 710a-710c may be arranged within the environment 700 including a first temperature sensor 710 arranged along the supply vent (e.g., between the supply fan 706 and an outlet to the conditioned space 708, and a second and third temperature sensors 710b, 701c arranged along the return vent (e.g., within the vent where air exits the conditioned space 708). The temperature sensor(s) 710a-710c may measure temperatures of, for instance, air that flows into the conditioned space 708, air that flows from the conditioned space 708, etc. Such measurements may be used as feedback for controlling the HVAC subsystem 440. The temperature sensor(s) 710a-710c may measure the temperatures at various sample rates (e.g., once a minute, once an hour, etc.). During normal operation, in some instances, one of the temperature sensor(s) 710a-710c may experience a fault. The fault may be intermittent (e.g., one sample of sensor data is faulty, but subsequent sensor data is good), or the fault may be persistent (e.g., several (or all) samples of the sensor data is faulty). In the following example, the temperature sensor 710b may provide faulty sensor data, as determined by the sensor fault detector 514.

The data classifier 516 may identify one or more attributes corresponding to the faulty sensor data from the temperature sensor 710b. For instance, the data classifier 516 may identify the timestamp, unit operation mode, weather conditions, set point, etc. corresponding to the faulty sensor data. The data classifier 516 may identify such attributes based on the metadata for the faulty sensor data, based on data from other components/devices within the system 500, etc. As described in greater detail below, the data selector 518 may be configured to select substitute data from the historical data repository 504 based on the attributes corresponding to the faulty sensor data from the temperature sensor 710b.

At step 602, the data selector 518 filters the entries in the historical data repository 504 by recent date. Specifically, the data selector 518 may apply a filter to the entries to filter out older data (e.g., data from previous hours, days, weeks, months, etc.) from the sensor which generated the faulty sensor data. As such, following step 602, the entries from the historical data repository may be those generated by the sensor which are most recent.

At step 604, the data selector 518 filters the entries in the historical data repository 504 by unit operating (e.g., OCC) mode. Specifically, the data selector 518 may apply a filter to the entries to filter out entries in which the unit OCC mode is off. Hence, the remaining entries following the filter applied at step 604 include those in which the unit OCC mode is on/enabled/active/high/1/etc. Where the unit mode is off, the sensor data may not be as accurate. As such, the data selector 518 may filter out data where the unit mode is off to increase the accuracy of the substitute sensor data.

At step 606, the data selector 518 filters the entries in the historical data repository 504 by set point. The data selector 518 may thus remove entries in the historical data repository 504 having a set point which are not the same as (or within a threshold of, such as +/−1%, 2%, 5%, etc.) the current set point. The entries remaining following application of the filter at step 606 may include those having a set point which is substantially the same as the current set point.

At step 608, the data selector 518 filters the entries in the historical data repository 504 by ambient temperature (OAT), ambient humidity (OAH), and/or occupancy (OCC). The data selector 518 may apply each (or a subset) of filters based on the OAT, OAH, OCC to identify entries having conditions most similar to present conditions.

At step 610, the data selector 518 determines whether any of the entries following the filtering described at steps 602-608 match the attributes corresponding to the faulty sensor data from the temperature sensor 710b. In some instances, following application of each of the filters described at steps 602-608, a plurality of entries may be present in the historical data repository 504. In other instances, following application of each of the filters described at steps 602-608, one entry may be present in the historical data repository 504. In still other instances, following application of each of the filters described at steps 602-608, no entries may be present in the historical data repository 504. Where no entries are present in the historical data repository 504 following application of each of the filters described at steps 602-608, the method 600 may proceed to step 614. Where at least one entry is present, the method 600 may proceed to step 612.

At step 612, the data selector 518 selects the substitute sensor data. In some embodiments, the data selector 518 may select the substitute sensor data from the historical data repository 504. Following application of the various filter(s) described herein, at least one attribute of the faulty sensor data may match at least one attribute of the substitute sensor data from the historical data repository 504. Hence, the substitute sensor data may be similar in at least some aspects to the faulty sensor data. The substitute sensor data may have at least one attribute in common with the faulty sensor data. In some instances, the substitute sensor data may have each attribute in common with the faulty sensor data. Where a plurality of entries are present following application of the filters described at steps 602-608, in some embodiments, the data selector 518 may select the most recent entry (e.g., entry having a timestamp which is closest to the timestamp for the faulty sensor data).

At step 614, the data selector 518 refers to sensor data in the historical data repository 504 from the same month as the month in the timestamp from the faulty sensor data but the previous year. In some embodiments, the data selector 518 removes all the filters applied at steps 602-610. Following removal of all the filters previously applied, the data selector 518 may apply a filter similar to the filter applied at step 602 to identify entries from the same month as a current month, but in a previous year (e.g., the immediately previous year, two or more years back, etc.). In other words, at step 614, the data selector 518 expands the scope of the search for substitute sensor data which has attribute(s) in common with the faulty sensor data. The data selector 518 may refer to the same month but a previous year, as conditions of the building 10 may be similar to current conditions.

At step 616, the data selector 518 repeats steps 604-608. Hence, the data selector 518 may re-apply the filters described above with reference to steps 604-608 to identify entries having at least one attribute in common with the faulty sensor data.

Similar to step 610, at step 618, the data selector 518 determines whether any of the entries following the filtering described at steps 614-616 match the attributes corresponding to the faulty sensor data from the temperature sensor 710b. In some instances, following application of each of the filters described at steps 614-616, a plurality of entries may be present in the historical data repository 504. In other instances, following application of each of the filters described at steps 614-616, one entry may be present in the historical data repository 504. In still other instances, following application of each of the filters described at steps 614-616, no entries may be present in the historical data repository 504. Where no entries are present in the historical data repository 504 following application of each of the filters described at steps 614-616, the method 600 may proceed to step 620. Where at least one entry is present, the method 600 may proceed back to step 612.

At step 620, the data selector 518 refers to sensor data in the historical data repository 504 from the previous year. Similar to step 614, the data selector 518 may be configured to remove the filters previously applied and expand the scope of the search to identify entries within the previous year. In various embodiments, the data selector 518 may expand the scope of the search to identify entries within several years.

At step 622, the data selector 518 repeats steps 604-608. Hence, the data selector 518 may re-apply the filters described above with reference to steps 604-608 to identify entries having at least one attribute in common with the faulty sensor data.

Similar to step 610 and step 618, at step 624, the data selector 518 determines whether any of the entries following the filtering described at steps 620-622 match the attributes corresponding to the faulty sensor data from the temperature sensor 710b. In some instances, following application of each of the filters described at steps 620-622, a plurality of entries may be present in the historical data repository 504. In other instances, following application of each of the filters described at steps 620-622, one entry may be present in the historical data repository 504. In still other instances, following application of each of the filters described at steps 620-622, no entries may be present in the historical data repository 504. Where no entries are present in the historical data repository 504 following application of each of the filters described at steps 620-622, the method 600 may proceed to step 626. Where at least one entry is present, the method 600 may proceed to step 612.

At step 626, the data selector 518 averages sensor data from similar temperature sensor(s) 710. The data selector 518 may identify a space in which the temperature sensor 710 services (e.g., temperature sensor 710b services the return vent for the conditioned space 708). The data selector 518 may identify the space based on the metadata from the temperature sensor 710, based on an identifier corresponding to the temperature sensor 710 and corresponding data accessible by the data selector 518 (such as a digital map or other data structure which includes data corresponding to a location of various sensor(s) 506 within the building 10). The data selector 518 may identify other temperature sensors 710 which service the same space (e.g., temperature sensor 710c also services the return vent for the conditioned space 708). The data selector 518 may be configured to compute an average of the sensor data from the temperature sensor 710c and other temperature sensor(s) 710 which service the same space (e.g., an average of a plurality of samples). In instance (such as the environment 700) where only one other temperature sensor 710c services the same space, the data selector 518 may identify the sample from the other temperature sensor 710c. However, where a plurality of temperature sensors 710 service the same space as the temperature sensor 710 which generated the faulty sensor data, the data selector 518 may compute the average of the sensor data from the other temperature sensors 710. It is noted that, in the environment 700, the data selector 518 may not consider data from the first temperature sensor 710a, as the first temperature sensor 710a services the supply vent (which may register colder temperatures as those registered by temperature sensors on the return vent).

While the filters described in FIG. 6 are provided herein, it is noted that the present disclosure is not limited to the particular filters (or order of filtering) described with reference to FIG. 6. To the contrary—the present disclosure contemplates variations of the filters applied, the order in which filter(s) are applied, etc. Hence, the data selector 518 generally selects substitute sensor data from the historical data repository 504 based on a comparison of at least one attribute of the substitute sensor data and the faulty sensor data. The data selector 518 may select the substitute sensor data from the historical data repository 504 which has at least one attribute in common.

The memory 512 is shown to include a data replacer 520. The data replacer 520 may be any device(s), component(s), application(s), agent(s), etc. designed or implemented to replace the faulty sensor data with substitute sensor data selected by the data selector 518. In some embodiments, the sensor diagnostic system 502 may package sensor data from a plurality of sensor(s) 506 into a single packet. Hence, all sensor data received from the sensor(s) 506 may be packaged together—including faulty sensor data. The data replacer 520 may be configured to replace the faulty sensor data with the substitute sensor data identified by the data selector 518. The data replacer 520 may thus replace faulty sensor data while maintaining "good" sensor data.

In some embodiments, the sensor diagnostic system 502 may provide, individually, samples of the sensor data. Hence, the data replacer 520 may replace sensor data determined to be faulty (e.g., by the sensor fault detector 514) with the substitute sensor data. In some embodiments, the data replacer 520 may maintain the metadata for the faulty sensor data while replacing the faulty sensor data itself with the substitute sensor data. In other embodiments, the data replacer 520 may replace the entire packet (e.g., the faulty sensor data and metadata corresponding thereto) with the entry corresponding to the substitute sensor data. The The sensor diagnostic system 502 may be configured to provide the substitute sensor data to the BMS controller 366. The BMS controller 366 may be configured to receive, at least, the substitute sensor data from the sensor diagnostic system 502. Specifically, the building subsystem integration layer 422 of the BMS controller 366 may be configured to receive the substitute sensor data. The BMS controller 366 may be configured to control various aspects and components of the building subsystem 428 based on the substitute sensor data.

In some embodiments, at each iteration where the sensor(s) 506 generate faulty sensor data, the sensor diagnostic system 502 may replace the faulty sensor data with selected substitute sensor data. The sensor diagnostic system 502 may replace the faulty sensor data with selected substitute sensor data so long as faulty sensor data is identified, until the corresponding sensor(s) 506 are replaced, until a manual override selection is received, etc.

Figure 8:
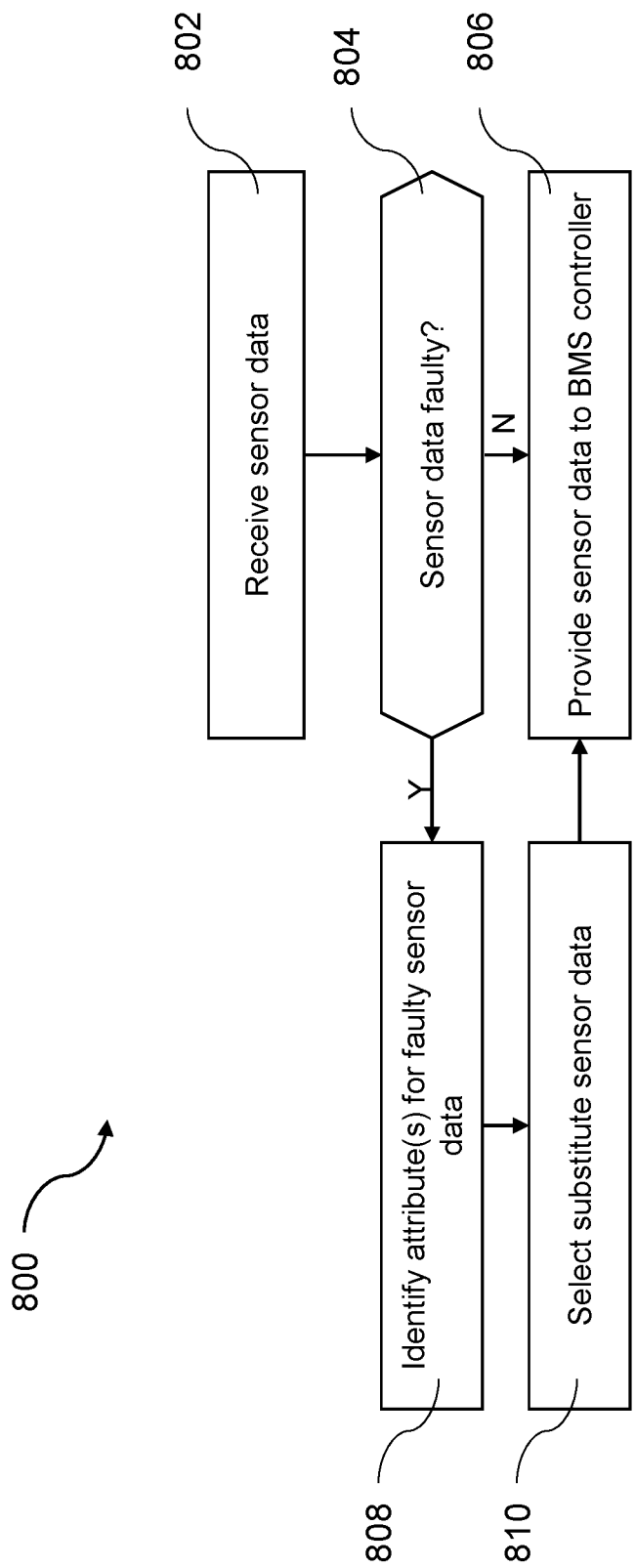
FIG. 8 is a flowchart depicting an example method of managing sensor data, according to an exemplary embodiment.

Referring now to FIG. 8, depicted is a flowchart showing an example method 800 of managing sensor data, according to an exemplary embodiment. The method 800 may be practiced by the systems, devices, components, etc. described above with reference to FIG. 1-7. However, the present disclosure is not limited to these particular systems, devices, components At step 802, the sensor diagnostic system 502 receives sensor data. In some embodiments, the sensor diagnostic system 502 may receive the sensor data from a sensor 506 of a building subsystem 428 which services a space in the building 10. The sensor diagnostic system 502 may receive the sensor data according to the sample rate for the sensor 506. Hence, in some embodiments, at least some of the steps described in method 800 may be performed in accordance with the sample rate for the sensor 506. In such embodiments, the sensor diagnostic system 502 may identify the sample rate for the sensor 506 (e.g., based on metadata from the sensor data, based on stored information corresponding to the sensor 506, etc.). The sensor diagnostic system 502 may repeat each (or a subset) of the steps described herein at the identified sample rate for the sensor 506.

At step 804, the sensor diagnostic system 502 determines whether the sensor data is faulty. Specifically, the sensor diagnostic system 502 may determine whether the sensor data received at step 802 is faulty. The sensor diagnostic system 502 may determine whether the sensor data is faulty based, at least in part, on the sensor data itself. The sensor diagnostic system 502 may perform rule and sub-rule based analysis and apply various criterion to determine whether the sensor 506 which provided the sensor data received at step 802 is experiencing a fault. For instance, where the sensor data provides incoherent, impossible, impractical feedback, the sensor diagnostic system 502 may determine that the sensor 506 is experiencing a fault (or that the sensor data is faulty). Where the sensor data is determined to be good (e.g., not faulty, the sensor 506 which provided the sensor data received at step 802 is not experiencing a fault, etc.), the method 800 may proceed to step 806. Where the sensor data is determined to be faulty, the method 800 may proceed to step 808.

In some embodiments, where the sensor data is determined to be faulty, the sensor diagnostic system 502 may automatically deactivate the corresponding sensor 506. The sensor diagnostic system 502 may generate and transmit a deactivation signal to the sensor 506. The sensor 506, upon receipt of the deactivation signal from the sensor diagnostic system 502, may automatically shut down, disable, cease transmission of sensor data, sleep, or otherwise deactivate. The sensor 506 may remain deactivated until repair or replacement (e.g., by a technician).

At step 808, the sensor diagnostic system 502 identifies one or more attributes for the faulty sensor data. The sensor diagnostic system 502 may identify the one or more attributes based on, for instance, metadata corresponding to the sensor data received at step 802, based on contextual or semantic information accessible by the sensor diagnostic system 502, etc. The sensor diagnostic system 502 may be configured to classify the faulty sensor data based on the one or more attributes. Such classifications may be used for identifying substitute sensor data for replacing the faulty sensor data.

At step 810, the sensor diagnostic system 502 selects substitute sensor data. In some embodiments, the sensor diagnostic system 502 may select the substitute sensor data for the sensor 506. The sensor diagnostic system 502 may select the substitute sensor data from a historical data repository 504. The historical data repository may be configured to store historical data from a plurality of sensor(s) 506. The historical data may include one or more attributes which define one or more characteristics in which the historical data was captured. Various examples of attributes include those shown in Table 1 shown and described above. Step 810 may include at least one or more of the steps described with reference to FIG. 6. Hence, the sensor diagnostic system 502 may select substitute sensor data which has at least one attribute in common (or similar to) the identified attributes for the faulty sensor data (e.g., identified at step 808).

At step 812, the sensor diagnostic system 502 provides the sensor data to the BMS controller 366. Where the sensor data received at step 802 is determined to not be faulty (e.g., the sensor data is good), the sensor diagnostic system 502 may provide the sensor data received at step 802 to the BMS controller 366. Where the sensor data received at step 802 is determined to be faulty, the sensor diagnostic system 502 may provide the substitute sensor data to the BMS controller 366. Hence, the sensor diagnostic system 502 may dynamically and automatically replace faulty sensor data with similar substitute sensor data.

The sensor diagnostic system 502 may replace the faulty sensor data at each sample for the sensor 506 (e.g., replaced at the identified sample rate for the sensor 506). In some embodiments, the sensor diagnostic system 502 may receive a disable signal. The sensor diagnostic system 502 may receive the disable signal from, for instance, an operator client device (e.g., by a corresponding operator). The operator may control the operator client device to generate the disable signal responsive to repairing the corresponding sensor 506, responsive to repeated heat or cool calls (which may indicate the substitute sensor data is insufficient for replacing the faulty sensor data), or other reason. Responsive to the sensor diagnostic system 502 receiving the disable signal, the sensor diagnostic system 502 may cease providing the substitute sensor data to the BMS controller 366. In some embodiments, the sensor diagnostic system 502 may provide the sensor data received at step 802 responsive to receiving the disable signal (for instance, when the sensor 506 has been serviced/replaced). In other embodiments, the sensor diagnostic system 502 may provide an empty set or otherwise remove (without replacing) the faulty sensor data.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the HVAC actuator and assembly thereof as shown in the various exemplary embodiments is illustrative only. Additionally, any element disclosed in one embodiment may be incorporated or utilized with any other embodiment disclosed herein. For example, the partial stroke test depicted in FIG. 16 may be executed by receiving instructions via the UART test system 1400, according to some embodiments, or may be executed by receiving instructions via the NFC device 518 according to some embodiments. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A sensor management system, the system comprising:
   a historical data repository configured to store historical data from a plurality of sensors, the historical data comprising one or more attributes defining one or more characteristics related to the capture of the historical data;
   a building management system (BMS) controller configured to control one or more components of a building subsystem based on data provided by one or more sensors of the plurality of sensors; and
   a sensor diagnostic system communicably coupled to the one or more sensors, the historical data repository, and the BMS controller, the sensor diagnostic system comprising a processing circuit including a processor and memory, the memory storing instructions that, when executed by the processor, cause the processor to perform operations, the operations comprising:
   receiving, from a first sensor of the one or more sensors, sensor data;
   determining, based on the sensor data, at least one fault in the sensor data;
   selecting, from the historical data repository, substitute sensor data for the first sensor, the substitute sensor data being selected based on a comparison of one or more attributes of the sensor data and the one or more attributes of the historical data in the historical data repository, wherein the one or more attributes of the sensor data comprise a set point for the space, and wherein the substitute sensor data is selected based on the one or more attributes of the sensor data matching the one or more attributes of the historical sensor data to within a threshold; and
   providing, in replacement of the sensor data from the first sensor, the substitute sensor data to the BMS controller to control the one or more components of the building subsystem based on the substitute sensor data.

2. The system of claim 1, wherein the operations further comprise:
   deactivating the first sensor responsive to determining that the sensor data includes at least one fault.

3. The system of claim 1, wherein providing the substitute sensor data comprises:
   identifying a sample rate for the first sensor; and
   providing, in replacement of the sensor data from the first sensor, the substitute sensor data to the BMS controller at the identified sample rate.

4. The system of claim 1, wherein the operations further comprise:
   receiving, from an operator client device, a disable signal; and
   disabling the providing of the substitute sensor data to the BMS controller.

5. The system of claim 1, wherein the one or more attributes of the historical sensor data is at least a portion of a timestamp indicating a day and month in which the historical sensor data is captured.

6. The system of claim 1, wherein the historical sensor data was captured at least a year prior to the sensor data being captured by the first sensor.

7. The system of claim 1, wherein the one or more attributes of the historical sensor data is metadata which indicates a service space, and wherein the first sensor services the service space.

8. A sensor management system, the system comprising:
   a sensor diagnostic system communicably coupled to a first sensor of a building subsystem, a historical data repository configured to store historical data from a plurality of sensors including the first sensor, the historical data comprising one or more attributes defining one or more characteristics related to the capture of the historical data, and a building management system (BMS) controller configured to control one or more components of the building subsystem based on data provided by the first sensor, the sensor diagnostic system comprising a processing circuit including a processor and memory, the memory storing instructions that, when executed by the processor, cause the processor to perform operations, the operations comprising:
   receiving, from the first sensor, sensor data;
   determining, based on the sensor data, at least one fault in the sensor data;
   selecting, from the historical data repository, substitute sensor data for the first sensor, the substitute sensor data being selected based on a comparison of one or more attributes of the sensor data and the one or more attributes of the historical data in the historical data repository, wherein the one or more attributes of the sensor data comprise a set point for the space, and wherein the substitute sensor data is selected based on the one or more attributes of the sensor data matching the one or more attributes of the historical sensor data to within a threshold; and
   providing, in replacement of the sensor data from the first sensor, the substitute sensor data to the BMS controller to control the one or more components of the building subsystem based on the substitute sensor data.

9. The system of claim 8, wherein providing the substitute sensor data comprises:
   identifying a sample rate for the first sensor; and
   providing, in replacement of the sensor data from the first sensor, the substitute sensor data to the BMS controller at the identified sample rate.

10. The system of claim 8, wherein the operations further comprise:
    receiving, from an operator client device, a disable signal; and
    disabling the providing of the substitute sensor data to the BMS controller.

11. The system of claim 10, wherein the disable signal is received responsive to the first sensor being replaced with a replacement sensor, and wherein the operations further comprise:
    providing, to the BMS controller, sensor data from the replacement sensor.

12. The system of claim 8, wherein the one or more attributes of the historical sensor data is at least a portion of a timestamp indicating a day and month in which the historical sensor data is captured.

13. The system of claim 8, wherein the historical sensor data was captured at least a year prior to the sensor data being captured by the first sensor.

14. The system of claim 8, wherein the one or more attributes of the historical sensor data is metadata which indicates a service space, and wherein the first sensor servicing the service space.

15. A method of managing sensor data, the method comprising:
    receiving, from a sensor of a building subsystem servicing a space in a building, sensor data;
    determining, based on the sensor data, a presence of faulty sensor data;
    selecting, from a historical data repository, substitute sensor data for the sensor, the historical data repository configured to store historical data from a plurality of sensors including the sensor and one or more attributes of the historical data, the substitute sensor data being selected based on a comparison of one or more attributes of the faulty sensor data and the one or more attributes of the historical data in the data repository, wherein the one or more attributes of the faulty sensor data comprise a set point for the space, and wherein the substitute sensor data is selected based on the set point corresponding to the sensor data matching the set point corresponding to the historical sensor data to within a threshold; and
    providing, in replacement of the sensor data from the sensor, the substitute sensor data to a building management system (BMS) controller configured to control one or more components of the building subsystem based on the substitute sensor data.

16. The method of claim 15, further comprising:
    deactivating the sensor responsive to determining that the sensor data is faulty.

17. The method of claim 15, wherein providing the substitute sensor data comprises:
    identifying a sample rate for the sensor; and
    providing, in replacement of the sensor data from the sensor, the substitute sensor data to the BMS controller at the identified sample rate.

18. The method of claim 15, further comprising:
    receiving, from an operator client device, a disable signal; and
    disabling the providing of the substitute data to the BMS controller.

19. The method of claim 15, wherein the one or more attributes of the historical sensor data is at least a portion of a timestamp indicating a day and month in which the historical sensor data is captured.

20. The method of claim 15, wherein the one or more attributes of the historical sensor data is metadata which indicates a service space, and wherein the sensor services the service space.

* * * * *